United States Patent
Kent et al.

(10) Patent No.: US 10,830,664 B2
(45) Date of Patent: Nov. 10, 2020

(54) SYSTEMS AND METHODS FOR FLUID FLOW METER INTEGRATED LEAK DETECTION

(71) Applicants: Ian Kent, Smyrna, GA (US); Brian Gestner, Atlanta, GA (US)

(72) Inventors: Ian Kent, Smyrna, GA (US); Brian Gestner, Atlanta, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 16/664,911

(22) Filed: Oct. 27, 2019

(65) Prior Publication Data

US 2020/0132565 A1    Apr. 30, 2020

Related U.S. Application Data

(60) Provisional application No. 62/751,676, filed on Oct. 28, 2018.

(51) Int. Cl.

| | | |
|---|---|---|
| *G01M 3/26* | (2006.01) | |
| *F17D 5/02* | (2006.01) | |
| *G01M 3/28* | (2006.01) | |
| *G01F 15/00* | (2006.01) | |
| *F17D 5/06* | (2006.01) | |
| *G01F 15/075* | (2006.01) | |
| *G01M 3/32* | (2006.01) | |

(52) U.S. Cl.
CPC .............. *G01M 3/2807* (2013.01); *F17D 5/06* (2013.01); *G01F 15/003* (2013.01); *G01F 15/075* (2013.01)

(58) Field of Classification Search
CPC .......... G01M 3/26; G01M 3/3254; F17D 5/02; F17D 5/06
See application file for complete search history.

(56) References Cited

U.S. PATENT DOCUMENTS

2017/0152648 A1 * 6/2017 Hammond .............. G01F 1/667
2018/0136076 A1   5/2018 Kusumura et al.

FOREIGN PATENT DOCUMENTS

EP   3 388 811 A1   10/2018

OTHER PUBLICATIONS

International Search Report and Written Opinion for Appl. Ser. No. PCT/US2019/058243 dated Jan. 24, 2020 (11 pages).

* cited by examiner

*Primary Examiner* — Herbert K Roberts
(74) *Attorney, Agent, or Firm* — Foley & Lardner LLP

(57) ABSTRACT

Systems and methods described herein allow for reliable and computationally efficient detection of fluid leak events or abnormal fluid usage/flow events. A fluid flow meter can measure fluid flow parameter values during a training phase. The fluid flow meter can generate, using the fluid flow parameter data, a training fluid flow duration pattern indicative of, for each value range of a plurality of value ranges of a respective time threshold value. The time threshold value can represent an estimate of a maximum fluid flow duration, within a given fluid flow event, for fluid flow associated with the corresponding value range. During a detection phase, the fluid flow meter can determine, for a value range, a respective fluid flow duration within a current fluid flow event. The fluid flow meter can detect a leak event upon the fluid flow duration exceeds the time threshold value for the same value range.

20 Claims, 9 Drawing Sheets

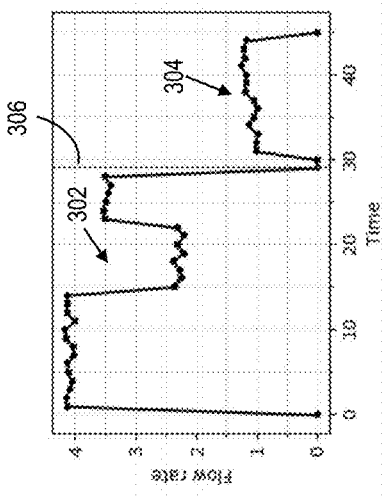
FIG. 3C
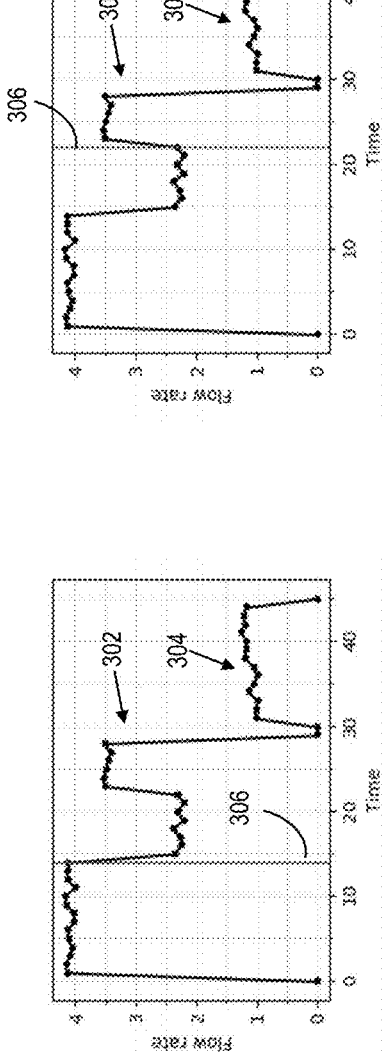
FIG. 3B
FIG. 3A
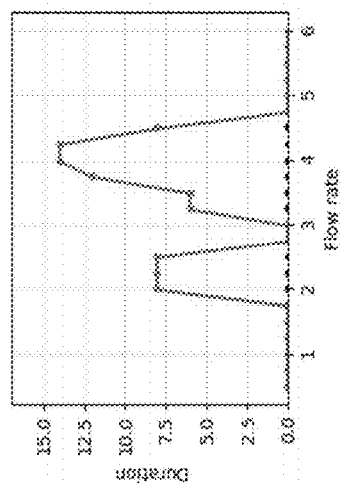
FIG. 3I
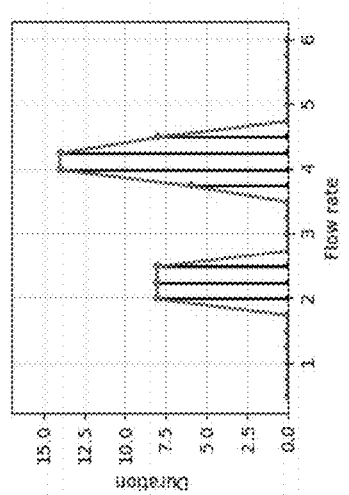
FIG. 3H
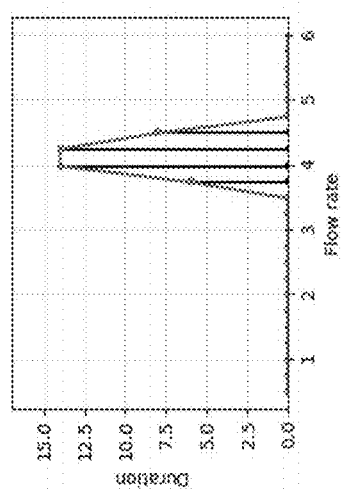
FIG. 3G

SYSTEMS AND METHODS FOR FLUID FLOW METER INTEGRATED LEAK DETECTION

CROSS REFERENCE TO RELATED APPLICATION

This application claims priority to U.S. Provisional Application No. 62/751,676, entitled "SYSTEMS AND METHODS FOR FLUID FLOW METER INTEGRATED LEAK DETECTION" filed on Oct. 28, 2018, which is incorporated herein by reference in its entirety.

BACKGROUND

Fluid distribution systems channel fluid from a supply line or main pipe to a plurality of devices that drive or dispense fluid through a network of pipes. For instance, a water distribution system associated with a dwelling or building includes a plurality of pipes coupled to each other through connectors and/or pipe fittings, and arranged to distribute water to fixtures (e.g., sink faucet, kitchen faucet, toilet flush, tub, heater, or a combination thereof), appliances (e.g., a dish washer, a washing machine, or a combination thereof), and/or sprinklers in the dwelling or building. Also, natural gas can be distributed to stoves or heaters in a dwelling or building through a respective gas distribution system.

Fluid flow meters, such as a water flow meter, allow for measuring the amount of fluid flowing into a fluid distribution system or passing through a pipe of the fluid distribution system. While fluid flow meters in general allow for measuring cumulative fluid consumption over time, there is demand for more advanced monitoring techniques of fluid distribution systems. Fluid leak events can be damaging economically or in terms of risk to human lives. For instance, water leak events can be damaging to real and personal property, besides the cost of leaked water. Also, natural gas leak events can cause dangerous and lethal fires or explosions. The ability to quickly detect fluid leak events as they start can help protect against such potential damages. However, detection of fluid leak events is technically challenging because it is difficult to distinguish fluid flow associated with normal from that driven by leak events.

SUMMARY

According to at least one aspect, a fluid flow meter can include a fluid flow sensor to generate fluid flow measurement signals indicative of fluid flow through a lumen of a fluid distribution system, a memory to store data and computer code instructions, and a processor communicatively coupled to the fluid flow sensor and the memory. The processor can execute the computer code instructions to determine, using a plurality of first measurement signals generated by the fluid flow sensor during a training phase subsequent to installation of the fluid flow meter in the fluid distribution system, a corresponding plurality of first measurements of a fluid flow parameter and first timing information. The fluid flow parameter can include fluid flow rate or fluid flow velocity, and the first timing information can be indicative of time intervals between consecutive first measurements. The processor can identify, using the plurality of first measurements, a plurality of first fluid flow events. Each first fluid flow event can represent a sequence of nonzero measurements of the plurality of first measurements. The processor can generate, using the plurality of first measurements, the first timing information and the plurality of first fluid flow events, a training flow duration pattern. The training flow duration pattern can be indicative of, for each value range of a plurality of value ranges of the fluid flow parameter, a respective time duration threshold representing an estimate of a maximum time duration, within fluid flow events, of fluid flow parameter values associated with the value range. The processor can determine, using a plurality of second measurement signals obtained from the fluid flow sensor during a detection phase subsequent to the training phase, a plurality of second measurements of the fluid flow parameter and second timing information. The second timing information can be indicative of time intervals between consecutive second measurements. The plurality of second measurements can be associated with a second fluid flow event representing a sequence of non-zero measurements. The processor can determine, using the plurality of second measurements and the second timing information, for a first value range of the plurality of value ranges, a time duration for fluid flow associated with the first value range. The processor can detect a leak event based on a comparison of the time duration for the first value range to the time duration threshold for the first value range.

According to at least one aspect, a method of detecting fluid leak events can include a fluid flow meter determining, using a plurality of first measurement signals generated during a training phase subsequent to installation of the fluid flow meter in a fluid distribution system, a corresponding plurality of first measurements of a fluid flow parameter and first timing information. The fluid flow parameter can include fluid flow rate or fluid flow velocity, and the first timing information can be indicative of time intervals between consecutive first measurements. The method can include the fluid flow meter identifying, using the plurality of first measurements, a plurality of first fluid flow events. Each first fluid flow event can represent a sequence of nonzero measurements of the plurality of first measurements. The method can include the fluid flow meter generating, using the plurality of first measurements, the first timing information and the plurality of first fluid flow events, a training flow duration pattern indicative of, for each value range of a plurality of value ranges of the fluid flow parameter, a respective time duration threshold representing an estimate of a maximum time duration, within fluid flow events, of fluid flow parameter values associated with the value range. The method can include the fluid flow meter determining, using a plurality of second measurement signals obtained during a detection phase subsequent to the training phase, a plurality of second measurements of the fluid flow parameter and second timing information. The second timing information can be indicative of time intervals between consecutive second measurements and the plurality of second measurements associated with a second fluid flow event. The second fluid flow event can representing a sequence of nonzero measurements. The method can include the fluid flow meter determining, using the plurality of second measurements and the second timing information, for a first value range of the plurality of value ranges, a time duration for fluid flow associated with the first value range. The method can include the fluid flow meter detecting, a leak event based on a comparison of the time duration for the first value range to the time duration threshold for the first value range.

According to at least one aspect, a non-transitory computer-readable medium comprising computer code instructions stored thereon. The computer code instructions, when executed by one or more processors, cause the one or more processors to determine, using a plurality of first measurement signals generated during a training phase subsequent to installation of a fluid flow meter in a fluid distribution system, a corresponding plurality of first measurements of a fluid flow parameter and first timing information. The fluid flow parameter can include fluid flow rate or fluid flow velocity, and the first timing information can be indicative of time intervals between consecutive first measurements. The one or more processors can identify, using the plurality of first measurements, a plurality of first fluid flow events. Each first fluid flow event can represent a sequence of nonzero measurements of the plurality of first measurements. The one or more processors can generate, using the plurality of first measurements, the first timing information and the plurality of first fluid flow events, a training flow duration pattern. The training flow duration pattern can be indicative of, for each value range of a plurality of value ranges of the fluid flow parameter, a respective time duration threshold representing an estimate of a maximum time duration, within fluid flow events, of fluid flow parameter values associated with the value range. The one or more processors can determine, using a plurality of second measurement signals obtained during a detection phase subsequent to the training phase, a plurality of second measurements of the fluid flow parameter and second timing information. The second timing information can be indicative of time intervals between consecutive second measurements. The plurality of second measurements can be associated with a second fluid flow event representing a sequence of nonzero measurements. The one or more processors can determine, using the plurality of second measurements and the second timing information, for a first value range of the plurality of value ranges, a time duration for fluid flow associated with the first value range. The one or more processors can detect, a leak event based on a comparison of the time duration for the first value range to the time duration threshold for the first value range.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

FIG. 3A-3L shows example simulation results of generating a training fluid flow duration pattern using a first approach, according to inventive concepts of the current disclosure;

Figure 1:
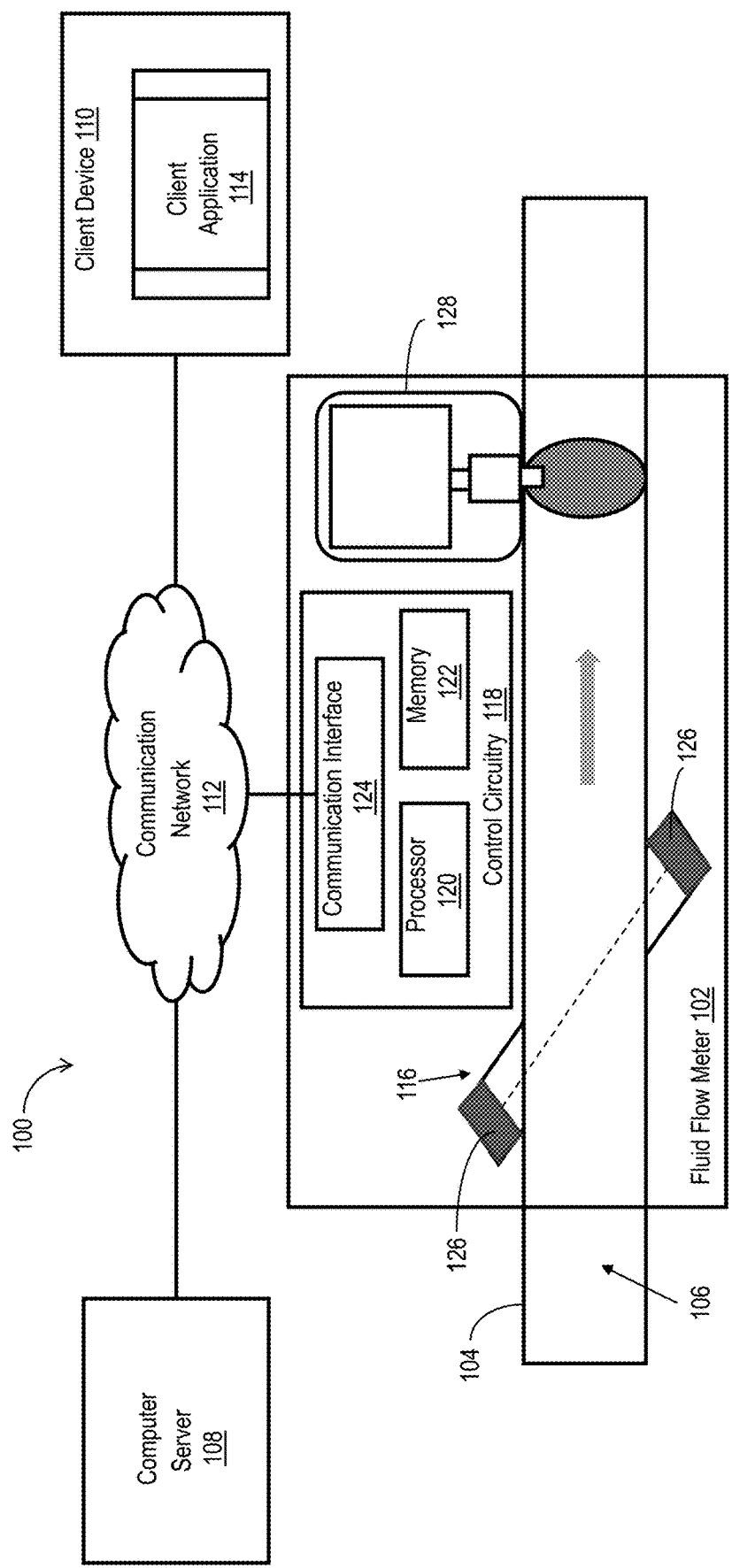
FIG. 1 is a block diagram of a computer environment for monitoring fluid usage in fluid flow system.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and embodiments of, inventive systems, methods and apparatus for providing fluid flow meter integrated leak detection. Features of example leak detection systems or methods can include, but are not limited to, computationally efficient leak detection solutions that take into account the fact that fluid usage varies significantly among people and dwellings (or buildings). The various concepts introduced above and discussed in greater detail below may be implemented in any of numerous ways, as the disclosed concepts are not limited to any particular manner of implementation. Examples of specific implementations and applications are provided primarily for illustrative purposes.

A fluid distribution system, such as a water distribution system or natural gas distribution system, can be associated with a dwelling, a building, a factory, a farm, or a business store, among others. The fluid flow system can include a network of pipes for serving fluid to fluid driving devices, such as appliances, fixtures, heaters, sprinklers, machines or a combination thereof. Whether the fluid is water, natural gas or some other fluid, fluid usage patterns and/or fluid flow patterns can vary significantly from one fluid distribution system to another or from one dwelling or building to another. Such variation can be seen even for similar usage scenarios in similar fluid distribution systems or similar dwellings. For example, when it comes to showering, using sink faucets, washing dishes, watering lawn, people can develop different habits with respect to how much water is used and at what flow rate. Even in a single dwelling, people living therein can use the shower, sink faucet or toilet flush differently with respect to the fluid amount they consume or fluid flow rate they chose per fluid flow event. Also, fluid usage patterns can vary based on the corresponding fluid driving devices, such as various fixtures or appliances. For example, water usage patterns associated with a washing machine can be significantly different from water usage patterns associated with a dishwasher, sink, tub or toilet flush.

The large variations in fluid usage patterns or fluid flow patterns makes detection of leak events or other abnormal fluid usage events technically complex and difficult to solve. Abnormal fluid usage events as used herein can include events, apart from leaks due to plumbing defects that inadvertently drive fluid flow, such as a faucet or sprinkler mistakenly left on or a malfunctioning washing machine or dishwasher. A malfunctioning washing machine or dishwasher can consume more or less water, or drive higher or lower fluid flow rate, than usual. Given the variation in fluid usage patterns or fluid flow patterns, a technical challenge in detecting fluid leak events or abnormal fluid usage events is how to reliably and accurately distinguish leak or abnormal fluid usage events from normal fluid usage events such as typical usage of fixtures, appliances or other devices capable of driving fluid flow. Specifically, a leak detection system or method that does not accurately or reliably distinguish between normal fluid usage events and leak or abnormal fluid usage events can lead to frequent false alarms or frequent misses of actual leak or abnormal usage events. Frequent false alarms usually frustrate users, while missing actual leak or abnormal usage events can lead to lability or users' loss of trust in the leak detection system or device.

A trained model or a set of fluid flow/usage features can be used to distinguish leak events or abnormal fluid usage events from normal fluid usage events. Trained models or fluid flow/usage features or signatures can be generated using training data, for example, collected or obtained during a training phase. The trained model or the fluid flow/usage features or signatures can vary, for example, based on the training data used during the training phase. The detection reliability, e.g., percentage of false alarms and/or percentage of misses, of a trained model or fluid flow/usage features or signatures used for leak detection can depend on the training data used to generate such trained model or fluid flow/usage features or signatures. The more accurately and more broadly the training data represents fluid flow/usage data potentially observed during a detection phase, the more reliable will be the detection performance of the trained model or the fluid flow/usage features or signatures used.

Another technical challenge in detecting fluid leak events or abnormal fluid usage events is the computational complexity of the detection technique(s) used. Computationally efficient detection techniques allow for meter integrated implementations, while computationally demanding techniques call for a server-side implementation. When implementing leak detection at a remote server, a fluid flow meter would transmit measured flow rate values to a remote server for use in leak (or abnormal fluid usage/flow) detection. Such implementation involves substantial communication with the server, and the execution of the detection process depends on the existence of a communication link between the fluid flow meter and the server. During the time when the communication link between the fluid flow meter and the server is down, the leak detection capability becomes unavailable.

Also, the accuracy, reliability and computational complexity of a leak or abnormal fluid usage detection method can depend on the type and form of trained models or fluid flow/usage features or signatures used in the detection method. Some fluid flow/usage features or signatures can reflect more than others the differences between normal and abnormal fluid usage events, therefore, allowing for more reliable distinction between these events. Also, the extraction and comparison of some features (e.g., shape patterns of fluid flow events) may be computationally more demanding than the extraction and comparison of other features such as the flow duration patterns used in embodiments of the current disclosure.

According to embodiments of the current disclosure, computationally efficient techniques for detecting leak events or abnormal fluid usage events can be integrated into a smart fluid flow meter. Compared to conventional fluid flow meters, smart fluid flow meters can provide various additional functionalities, e.g., other than conventional fluid usage/flow metering, such as leak or abnormal fluid usage detection, reporting fluid usage to remote computing devices, sending alerts to the remote computing devices or a combination thereof. Such functionalities, can provide users with real time visibility of fluid usage and/or control over respective fluid distribution systems. Smart fluid meters usually include processing capabilities, such as hardware processor(s) or circuitry and software instructions, to implement the additional functionalities.

Systems, devices and methods described in the current disclosure allow for reliable and computationally efficient detection of fluid leak events or abnormal fluid usage/flow events. A fluid flow meter can measure fluid flow rate, or fluid flow velocity, values during a training phase. The fluid flow meter can generate, using the fluid flow rate or fluid flow velocity data, a training fluid flow duration pattern indicative of, for each value range of a plurality of value ranges of a respective time threshold value. The time threshold value can represent an estimate of a maximum fluid flow duration, within a given fluid flow event, for fluid flow associated with the corresponding value range. During a detection phase, the fluid flow meter can determine, e.g., in real time, for a given value range, a respective fluid flow duration associated with a current fluid flow event. The fluid flow meter can detect a leak event upon the fluid flow duration exceeds the time threshold value for the same value range.

The fluid flow meter can generate or determine fluid flow durations during the detection phase in a similar way as the training fluid flow duration pattern is generated during the training phase. The fluid flow meter can compare the current fluid flow duration pattern to the training fluid flow duration pattern to determine whether the current fluid flow event corresponds to normal fluid usage event or an abnormal fluid usage event. For instance, the fluid flow meter can determine a current fluid flow event to be an abnormal fluid usage event if any flow duration value of the current fluid flow duration pattern (corresponding to a respective flow rate range) exceeds the corresponding time duration threshold value in the training fluid flow duration pattern.

The leak detection methods described herein allow for reliable and efficient meter-integrated fluid leak or abnormal fluid usage/floe detection in real time. The detection methods or techniques can be implemented and executed in real time by a fluid flow meter having computational or processing capabilities, such as a hardware processor or circuitry, and storage capabilities such as a memory device. The amount of data to be stored by the fluid flow meter is relatively insignificant, for example, compared to conventional fluid monitoring methods. Specifically, the fluid flow meter can monitor fluid usage in real time using a number (e.g., about or less than 100) of time threshold values each of which corresponds to a respective fluid flow rate range (or a fluid flow velocity range) of a number of fluid flow rate ranges (or fluid flow velocity ranges).

FIG. 1 is a block diagram of a computer environment 100 for monitoring fluid usage or fluid flow through a lumen of a fluid distribution system and detecting leak or abnormal usage events. The computer environment 100 can include a fluid flow meter 102 mounted on a tubular structure 104, such as a pipe, a hose, tailpiece or pipe connector. The tubular structure 104 defines a lumen 106 through which fluid flows inside the tubular structure 104. As used herein, a lumen, such as lumen 106, represents the inside space defined by a tubular structure, such as tubular structure 104. The gray arrow shown within the lumen 106 represents the fluid flow direction through the lumen 106. The computer environment 100 can include one or more remote computer servers 108 and one or more client devices 110 communicatively coupled to the fluid flow meter 102 through a communications network 112. The client device(s) 110 can include a client application 114 for interacting with the fluid flow meter 102 and/or processing and displaying data received from the fluid flow meter 102. The communication network 112 can include a landline network, a wireless network, a local area network, a wide area network, the like or a combination thereof.

The fluid flow meter 102 can include a fluid flow sensor 116 and a control circuitry 118 communicatively coupled to the fluid flow sensor 116. The control circuitry 118 can include a processor 120, a memory 122 and a communication interface 124. The fluid flow sensor 116 can be an ultrasonic fluid flow sensor including two or more ultrasonic transducers 126. The ultrasonic transducers 126 can be mounted in a non-invasive manner. That is, the ultrasonic transducers 126 can be mounted on the tubular structure 104 without making any holes therein. As such, the ultrasonic transducers 126 or any mounting devices thereof do not interfere with the fluid flow path within the lumen 106. In some implementations, the ultrasonic transducers 126 can be placed within openings of the tubular structure 104 in an invasive manner. Each of the ultrasonic transducers 126 can be capable of transmitting and receiving ultrasonic signals. The travel time of the ultrasonic signal propagating in the lumen 106 between the ultrasonic transducers 126 can depend on the fluid flow velocity within the lumen 106. While FIG. 1 shows the fluid flow sensor 116 to be an ultrasonic fluid flow sensor, other types of fluid flow sensors, such as electromagnetic flow sensors, propeller flow sensors, paddle wheel flow sensors, or the like, are contemplated by the current disclosure.

The processor 120 can be communicatively coupled to fluid flow sensor 116, the memory 122, and the communication interface 124. The processor 120 can receive measurement signals (e.g., electric signal generated by the ultrasonic transducers 126) from the fluid flow sensor 116, and use the measurement signals to determine corresponding measurements of a fluid flow parameter such as fluid flow rate or fluid flow velocity. For example, the processor 120 can receive a sequence of measurement signals associated with one or more fluid flow events and determine (or generate) for each measurement signal a corresponding measurement value of the fluid flow parameter. For an ultrasonic fluid flow senor 116, the processor 120 can use cross-correlation functions between each measurement signal and a reference signal to determine the corresponding fluid flow parameter measurement. As used herein, a fluid flow event represents an event that can start from zero flow, continuously drive non-zero fluid flow through the lumen 106 for some time duration, and end when zero flow is reached again. An on-going fluid flow event is one that is still driving non-zero fluid flow through the lumen 106. In terms of measurements of the fluid flow parameter, a fluid flow event can be viewed as a sequence of non-zero measurements or measurements exceeding a predefined threshold value. The fluid flow event can be preceded and followed by zero-flow measurements (e.g., equal to zero or less than the predefined threshold value). Considering potential error measurements of fluid flow meters, a fluid flow event can be defined as a continuous fluid flow with corresponding fluid flow rate (or fluid flow velocity) being continuously greater than a predefined threshold value (e.g., 0.02 GPM, 0.01 GPM or 0 GPM). The fluid flow event can start when the fluid flow rate (or fluid flow velocity) exceeds the predefined threshold value and continues until the fluid flow rate (or fluid flow velocity) goes below the predefined threshold value.

The processor 120 can keep track of time durations between consecutive measurement signals or respective measurements of the fluid flow parameter. The processor 120 can obtain (e.g., from an electronic device of the control circuitry 118) or generate time information indicative of time intervals between consecutive measurement signals or consecutive measurements of the fluid flow parameter. The time information can include timestamps (or time values) indicative of time instances or relative time instances at which the measurement signals were received from the fluid flow sensor 116. The relative time instance for each measurement signal can represent the time lapse between a time reference (e.g., time of receipt of a previous measurement signal) and time of receipt of the measurement signal. The processor 120 can assign to each fluid flow parameter measurement the timestamp (or time value) associated with the measurement signal used to determine or compute the fluid flow parameter measurement. In some implementations, the processor 120 can generate for each fluid flow parameter measurement a respective timestamp (or time value) indicative of the time instance or relative time instance at which the fluid flow parameter measurement is determined or computed. The processor 120 can use the time information to determine durations of fluid flow events, a time duration during which fluid flow parameter measurements associated with a fluid flow event are within a given value range or interval, or a combination thereof.

The processor 120 can use training data obtained during a training phase, or training period, to generate a fluid flow duration pattern for use to detect leak events or abnormal fluid usage/flow events. The training data can include fluid flow parameter measurements and corresponding time information. The training phase or training period can occur after installation of the fluid flow meter in the fluid distribution system (or corresponding dwelling). As such, the training data can be collected from the dwelling or building where the fluid flow meter 102 is deployed, and therefore, can more accurately reflect typical fluid flow events (or normal fluid usage/flow events) for the dwelling or building. The training phase can be automatically, or manually, initiated. For instance, the fluid flow meter 102 can include a button or can provide one or more user interface (UI) icons on a display for manually initiating the training phase. The processor 120 can automatically initiate the training phase upon initial actuation of the fluid flow meter 102 after installation. The training phase can last for a predetermined period of time, such as few days, one or more weeks or other time period. During a training phase, the processor 120 can maintain a flag or time counter indicating that the training phase is ongoing.

The processor 120 can automatically, or a user of the fluid flow meter 102 can manually, repeat the training phase over time to collect new training data. By repeating the training phase over time, the newly collected training data can adequately reflect changes in fluid usage habits in the dwelling or building. Collected training data, or any fluid flow duration pattern generated from the training data, can expire after a predefined period of time. For instance, the processor 120 can maintain a time counter that reflects the remaining time period till expiration of the training data or the fluid flow duration pattern generated thereof. Upon expiration of the training data or the fluid flow duration pattern generated thereof, the processor 120 can automatically initiate a new training phase or alert the user of the fluid flow meter 102, for example, through the client application 114, to trigger manual initiation of the new training phase.

Using training data, the processor 120 can generate a training (or trained) fluid flow duration pattern for use to detect fluid leak events or abnormal usage/flow events. The training data can be associated with a plurality of fluid flow events observed during the training phase. The training fluid flow duration pattern can include a plurality of value ranges or intervals of the fluid flow parameter (e.g., fluid flow rate or fluid flow velocity) and one or more time duration threshold values associated with one or more respective value ranges of the fluid flow parameter. Each time duration threshold value of the training fluid flow duration pattern can represent the maximum time duration for the fluid flow parameter to be within one or more respective value ranges of the fluid flow parameter during any fluid flow event. For instance, a flow duration pattern can be viewed as a plurality of bins each of which corresponds to a value range or interval of the fluid flow parameter, e.g., a value range that is 0.25 gallons per minute (GPM) wide for fluid flow rate. The amplitude or height of each bin can be indicative of a corresponding time duration threshold value. For example, for each value range of the plurality of value ranges, the corresponding time duration threshold value can represent an estimate of the maximum time duration, within any fluid flow event, during which fluid flow rate (or fluid flow velocity) would be within that value range. According to another example, the time duration threshold value for a given value range of the fluid flow parameter can represent an estimate of the maximum time duration, within any fluid flow event, during which fluid flow rate (or fluid flow velocity) would be within that value range or any lower value range. According to yet another example, the time duration threshold value for a given value range of the fluid flow parameter can represent an estimate of the maximum time duration during which the maximum fluid flow rate (or maximum fluid flow velocity) to be recorded since the start of a fluid flow event would be within that value range.

The memory 122 can store computer code instructions and data, such as fluid flow parameter measurements, time information, one or more data structures representing at least one training fluid flow duration pattern, among others, or a combination thereof. For example, the memory 122 can store a data structure including indications of the plurality of value ranges (or intervals) of the fluid flow parameter, and the corresponding fluid flow duration thresholds. The memory 122 can store or maintain time counters or flags indicating that a training phase is ongoing. The computer code instructions, when executed by the processor 120 can cause the processor 120 or the fluid flow meter 102 to perform any of the methods disclosed herein.

During the detection phase, the processor 120 can receive a plurality of measurement signals from the fluid flow sensor associated with a current fluid flow event. The processor 120 can determine corresponding measurement values of the fluid flow parameters and corresponding timing information. The processor 120 can generate or determine a fluid flow duration for a given value range based on the measurement values of the fluid flow parameter and the timing information. The fluid flow duration can represent a time duration, within the fluid flow event, for fluid flow associated with the value range according to a given rule or scheme. The processor 120 can generate the fluid flow duration in a similar way as the training fluid fluid flow duration pattern is updated for each new fluid flow event during the training phase.

The communication interface 124 can include one or more communication ports. The communication interface 124 can allow the processor 120 or the fluid flow meter 102 to communicate via the communication network 112 with remote computing devices, such as the computer server 108 or the client device 110. For example, the fluid flow meter 102 or the respective processor 120 can communicate with the client application 112 installed on the client device 110 to send alerts of leak or abnormal fluid usage/flow events, receive feedback or instructions from the client application 114 or a combination thereof. The fluid flow meter 102 or the respective processor 120 can communicate with the computer server 108 to report, for example, constructed fluid flow duration patterns or updates thereof, performance statistics of the detection technique(s) employed, or a combination thereof. The fluid flow meter 102 or the respective processor 120 can request or receive from the computer server 108 computer code instructions for detection methods (or algorithms) or updates thereof, instructions to start a training phase (or process), or a combination thereof. For example, the computer server 108 can keep track of the time duration since the last training process performed by the fluid flow meter 102 and/or performance statistics of leak detection at the fluid flow meter, and determine when to instruct the fluid flow meter to initiate a new training phase. The computer server 108 can trigger a new a training phase, for example, upon detecting a deterioration (or degradation) in the detection performance of the fluid flow meter 102.

The processor 120 can compare fluid flow durations, for various value ranges of the fluid flow parameter, with corresponding time threshold values in the training fluid flow duration pattern to determine whether a current fluid flow event correspond to a normal fluid usage/flow event or a leak or abnormal fluid usage/flow event. If any flow duration value associated with a respective value range exceeds the corresponding time threshold value for the same fluid flow parameter value range in the training fluid duration pattern, the processor 120 can determine that the current fluid flow event is a leak event or an abnormal fluid usage/flow event.

Upon detecting a leak event or an abnormal fluid usage/flow event, the processor 120 can send an alert signal to the computer server 108 indicative of a fluid leak or an abnormal fluid usage/flow event. The alert signal can include information related to or indicative of the fluid flow duration values computed for the current fluid flow event pattern and/or the training fluid flow duration pattern. The alert signal can include an identifier (ID) of the fluid flow meter 102. The computer server 108 can forward the alert signal to the client device 110 or the client application 114 running thereon. In some implementations, the computer server 108 can determine whether or not to forward the alert signal to the client application 112 based on, for example, information included in the alert signal.

In some embodiments, the fluid flow meter 102 may further include (or may be further coupled to) a shut-off valve 128. The processor 120 may cause the shut-off valve 128 to close and block fluid flow through the lumen 106 in response to detection of a leak event or an abnormal fluid usage event, or in response to instructions received from the client application 114 or the client device 110. The fluid flow meter 102 may include other components (not shown in FIG. 1), such as an analog-to-digital converter (ADC) to sample measurement signals received from the fluid flow sensor 116, a controller to control (e.g., actuate or de-actuate) the shut-off valve 128 or a combination thereof.

Figure 2:
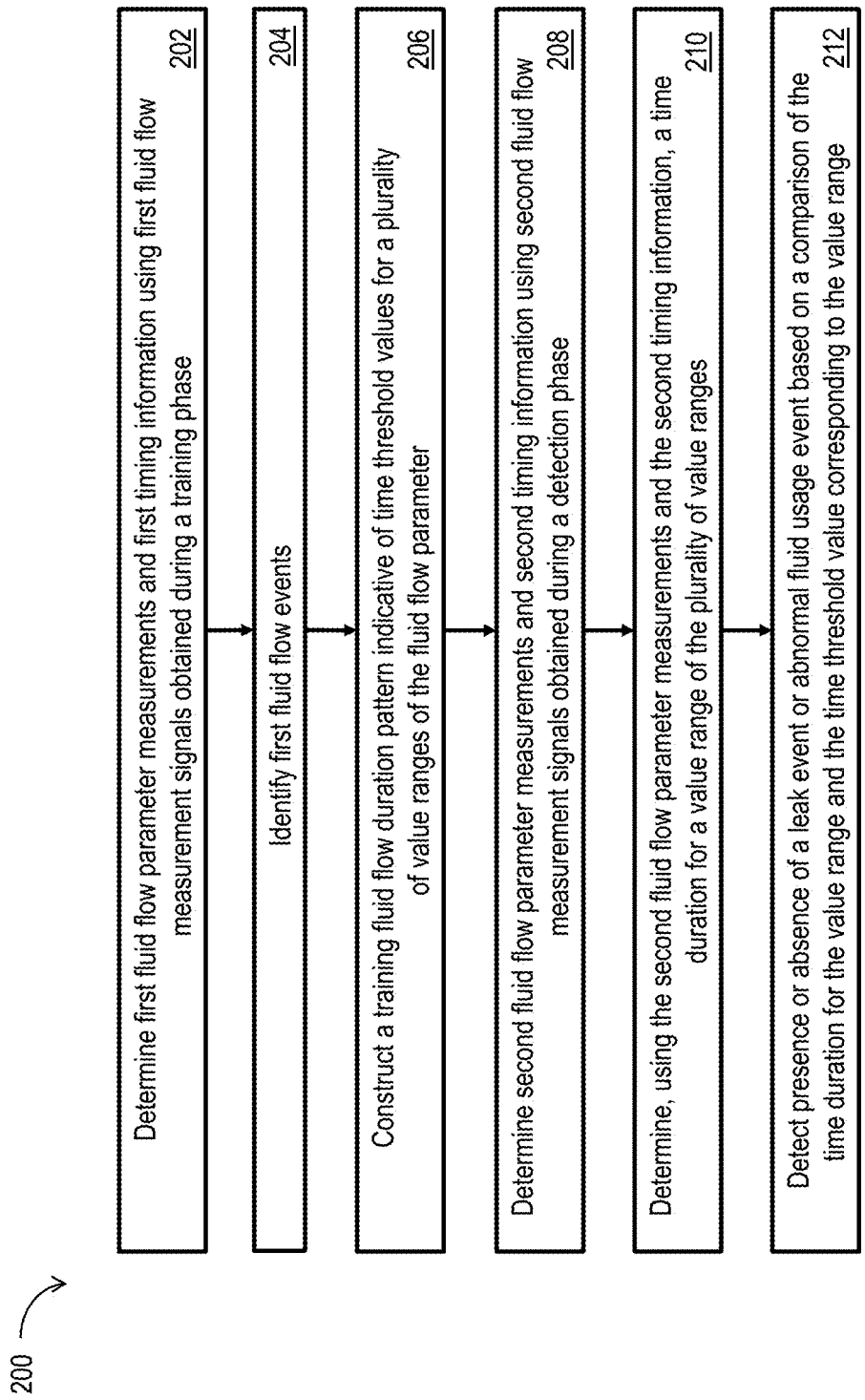
FIG. 2 is a flowchart illustrating a method of fluid leak detection, according to inventive concepts of the current disclosure.

FIG. 2 is a flowchart illustrating a method 200 of fluid leak detection, according to inventive concepts of the current disclosure. The method 200 can include determining, using a plurality of first fluid flow measurement signals generated during a training phase, a corresponding plurality of first measurements of a fluid flow parameter and first timing information (ACT 202). The method 200 can include identifying, using the plurality of first measurements, a plurality of fluid flow events (ACT 204). The method 200 can include construction (or generating) a training fluid flow duration pattern, using the plurality of first measurements and the first timing information, indicative of time threshold values for a plurality of value ranges of the fluid flow parameter (ACT 206). The method 200 can include determining, using a plurality of second fluid flow measurement signals generated during a detection phase, a plurality of second measurements of the fluid flow parameter and second timing information (ACT 208). The method 200 can include determining, using the plurality of second fluid flow parameter measurements and the second timing information, a time duration for a value range of the plurality of value ranges (ACT 210). The method 200 can include detecting presence (or absence) of a leak event (or abnormal fluid usage event) based on a comparison of the determined time duration for the value range with the time threshold value for the value range (ACT 212).

Referring to FIGS. 1 and 2, the method 200 can be carried out by the fluid flow meter 102, the computer server 108 or the client device 110. While the following describes execution of the method 200 by the fluid flow meter 102, the computer server 108 or the client device 110 can include one or more processors, one or more memory devices and executable instructions to execute the method 200. The method 200 can be viewed as including a training process that includes ACTS 202-206 and is carried out during a training phase, and a detection process that includes ACTS 208-212 and is carried out during a detection phase. The training phase can occur after installation of the fluid flow meter 102 within (or on) a fluid distribution system, and the detection phase can be subsequent to the training phase. The fluid flow meter 102 can carry out multiple training processes over time subsequent to deployment or installation. As discussed above with regard to FIG. 1, the processor 120 can automatically (or a user can manually) trigger a training process. The processor 120 can maintain a flag or time counter indicative of an ongoing training process.

The method 200 can include the fluid flow meter 102 or the processor 120 determining, during a training phase, a plurality of first measurement values of a fluid flow parameter and first timing information (ACT 202). The fluid flow sensor 116 can generate, during a training phase, a plurality of first fluid flow measurement signals, such as ultrasonic fluid flow measurement signals. For example, the processor 120 can cause the fluid flow sensor 116 to generate a plurality of measurement signals during the training phase for use to determine, or compute, a respective plurality of fluid flow parameter measurements, such as measurements of the fluid flow rate or fluid flow velocity through the lumen 106. The processor 120 can obtain the measurement signals from the fluid flow sensor 116, and can determine or generate for each measurement signal a corresponding timestamp (or time value) indicative of, for example, a time instance or relative time instance at which the measurement signal is generated by the fluid flow sensor 116 or received by the processor 120. The processor 120 can record the time of reception of each first measurement signal in a corresponding first timestamp. The processor 120 can retrieve (or obtain) the time of reception of each first measurement signal from a clock signal associated with the processor 120. The first timing information can include the timestamps or time values generated by the processor 120 using the plurality of measurement signals. In general, the first timing information can be indicative of time intervals between consecutive first measurements or consecutive measurement signals. The processor 120 can determine, for each measurement signal, a corresponding measurement of the fluid flow parameter (e.g., fluid flow rate or fluid flow velocity). For example, the processor 120 can use cross-correlation functions between ultrasonic measurement signals and a reference signal to determine corresponding measurements of the fluid flow parameter. The processor 120 can cross-correlate each first measurement signal received from an ultrasonic fluid flow sensor with a reference signal to determine, for example, a travel time associated with propagation of a corresponding ultrasonic signal through the fluid in the lumen 106, and determine the fluid flow velocity or fluid flow rate using the determined travel time.

The method 200 can include the fluid flow meter 102 or the processor 120 identifying, using the plurality of first measurements, a plurality of first fluid flow events. Each first fluid flow event can represent a sequence of measurements of the plurality of first measurements exceeding a predefined value (e.g., zero), and preceded and followed by a measurement less than the predefined value. The processor 120 can maintain a flag or time counter indicative of an ongoing fluid flow event. When processing measurements of the fluid flow parameter in real time, the processor 120 can detect start of a fluid flow event when a measurement of the fluid flow parameter first exceeds the predefined value, and the processor 120 can set the flag (or time counter) to indicate start of the fluid flow event. The processor 120 can detect end of the fluid flow event when a new measurement of the fluid flow rate is less than the predefined value. When processing the measurements offline, the processor 120 can segment the plurality of first measurements into a plurality of first fluid flow events.

The method 200 can include the fluid flow meter 102 or the processor 120 generating, using the plurality of first measurements, the first timing information and the plurality of first fluid flow events, a training fluid flow duration pattern (ACT 208). The training fluid flow duration pattern can include a plurality of value ranges of the fluid flow parameter. The value ranges can be disjoint and can represent all practically possible values of the fluid flow parameter. The training fluid flow duration pattern be indicative, for each value range of the plurality of value ranges of the fluid flow parameter, of a respective time threshold value representing an estimate of a maximum time duration associated with the value range. The time threshold value for a given value range can represent an estimate of the maximum time duration, within any given fluid flow event, during which fluid flow parameter values that belong to the value range (or are associated with the value range according to a predefined rule) can be observed. The training flow duration pattern can be viewed as a plurality of bins with each bin can representing a corresponding value range (or interval) of the fluid flow parameter. The amplitude of each bin can be the time threshold value representing an estimate of maximum fluid flow duration for fluid flow associated with that bin (or the corresponding value range) according to a specified rule. The processor 118 can maintain one or more time counters (e.g., a time counter for each bin of the training (or trained) flow duration pattern). The time counters can be set to zero at the start of the training phase.

The processor 120 can, for example, sequentially process the plurality of first measurements of the fluid flow parameter, and assign or maintain a separate time counter for each value range of the plurality of value ranges. For each fluid flow event, the processor 120 can map each of the first measurements associated with the fluid flow event to one or more corresponding bins (or value ranges) of the plurality of bins (or value ranges) of the training fluid flow duration pattern. For instance, the processor 120 can map each current first measurement to a value range including the value of that current first measurement. The processor 120 can map each current first measurement to the value range including the value of that current first measurement and to other lower value ranges. The processor 120 can map each current first measurement to the value range including (or corresponding to) the maximum measurement value recorded (or processed) so far in the fluid flow event. The processor 120 can increment the time counter(s) for the one or more corresponding bins (or value ranges) by a time increment equal to the time interval between the consecutive first measurements; the current first measurement of the fluid flow parameter and the previous or preceding first measurement of the fluid flow parameter. For example, the processor 120 can increment the time counter(s) for the one or more corresponding bins (or value ranges) by a time increment equal to the difference between a current time stamp (of the current first measurement) and a previous time stamp (of the previous first time measurement). The processor 120 can increment one or more other time counters associated with one or more other bins (or value ranges) that are adjacent to (or neighboring) the a bin or value range mapped to the current first measurement. Expanding the bins or value ranges for which respective time counters are incremented can help account for measurement errors or variations in patterns of normal fluid usage/flow events.

At the end of the fluid flow event (or after processing first measurements of the fluid flow event), the processor 120 can use time values associated with the time counters to update one or more corresponding time threshold values of the training fluid flow duration pattern. For example, the processor 120 can compare each time threshold value in the training fluid flow duration pattern with the corresponding time counters (e.g., both correspond to the same bin or value range). Upon determining that the time threshold value is smaller than the corresponding time counter, the processor 120 can update the time threshold value to be equal to the corresponding time counter. The processor 118 can reset the time counters at the end (or start) of each fluid flow event, and repeat the same process for all fluid flow events occurring during the training phase (or associated with the plurality of first measurements) until all the first measurements are processed.

An example approach of generating the training fluid flow duration pattern is referred to herein as flow duration with (or without) buffer. The processor 120 can maintain or assign a separate time counter for each value range of the plurality of values ranges of the training fluid flow duration pattern. For each first fluid flow event of the plurality of first fluid flow events, the processor 120 can process (e.g., sequentially) the respective sequence of measurements by (i) identifying a value range of the plurality of value ranges to which a current measurement of the respective sequence of non-zero measurements belongs, and (ii) incrementing the time counter of the identified value range by a time increment equal to a time interval between the current measurement and a preceding measurement. In other words, the processor 120 can assign (or map) each first measurement of the fluid flow parameter associated with a fluid flow event to a corresponding bin and then increment the time counter of that bin (without-buffer approach). The processor 120 can also increment one or more time counters of neighboring bins (with-buffer approach). At the end of the fluid flow event, the processor 120 can, for each value range of the plurality of value ranges, (a) compare the time counter of the bin (or value range) to the time duration threshold value of that bin (or value range), and (b) responsive to determining that the time threshold value of the value range is less than the time counter of the same value range, update the time threshold of the value range to be equal to the time counter of the value range. The processor can then reset, for each value range of the plurality of values ranges, the respective time counter to zero after.

An example implementation in pseudo-C of the flow duration with buffer approach is provided below.

```
import os
import sys
import pandas as pd
import numpy as np
# defines
FR_START    = 0.5
FR_END      = 6.0
FR_INTERVAL = 0.25
n_thresholds = int((FR_END-FR_START)/FR_INTERVAL)+1 # unsigned short
tracked_flowrates = np.linspace(FR_START, FR_END, n_thresholds)
thresholds = np.zeros(n_thresholds, dtype='float32') # float
cur_durations = np.zeros(n_thresholds, dtype='uint32') # uint32
prev_timestamp = None # uint32
leak_alert = False # bool
training_complete = False
water_flowing = False
def reset_training( ):
        global training_complete
        global leak_alert
        thresholds[:] = 0
        cur_durations[:] = 0
        training_complete = False
        leak_alert = False
def time_since_last_reading(timestamp):
        if prev_timestamp is None:
                return 0
        else:
                return timestamp - prev_timestamp
def get_tracked_fr_idx(flowrate):
        '''
        :type flowrate: float
        :rtype: int
        '''
```

```
            return np.argmin(np.abs(flowrate - tracked_flowrates))
def train_update(timestamp, flowrate):
        global prev_timestamp
        global water_flowing
        dt = time_since_last_reading(timestamp) # uint32
        if flowrate >= tracked_flowrates[0]:
                tracked_fr_idx = get_tracked_fr_idx(flowrate)
                update_i = np.arange(tracked_fr_idx-1, tracked_fr_idx+2) update_i = update_i[(update_i >= 0)
                & (update_i < n_thresholds)] cur_durations[update_i] += dt
                water_flowing = True
        elif water_flowing:
                update_i = cur_durations > thresholds
                thresholds[update_i] = cur_durations[update_i]
                water_flowing = False
                cur_durations[:] = 0
        prev_timestamp = timestamp
def detect_update(timestamp, flowrate, offset=0):
        global prev_timestamp
        global water_flowing global leak_alert
        dt = time_since_last_reading(timestamp) # uint32
        if flowrate >= tracked_flowrates[0]:
                tracked_fr_idx = get_tracked_fr_idx(flowrate)
                update_i = np.arange(tracked_fr_idx - 1, tracked_fr_idx + 2) update_i = update_i[(update_i >= 0)
                & (update_i < n_thresholds)] cur_durations[update_i] += dt
                water_flowing = True
                leak_alert = np.any(cur_durations[update_i] > (thresholds[update_i]+offset))
        elif water_flowing:
                cur_durations[:] = 0
                water_flowing = False
                leak_alert = False
        prev_timestamp = timestamp
def check_leak_status( ):
        return leak_alert
def set_training(complete=True):
        global training_complete
        training_complete = complete
```

FIGS. 3A-3L show example simulation results for generating the training fluid flow duration pattern using the flow duration with buffer approach described above. FIGS. 3A-3F show fluid flow rate measurements, over time, for two fluid flow events 302 and 304. The line 306 in FIGS. 3A-3F indicates the progress in processing the fluid flow rate measurements. FIGS. 3G-3L represent the progress in generating the fluid flow duration pattern at the time instances indicated by the line 306 in FIGS. 3A-3F, respectively. The training fluid flow duration pattern includes bins (or value ranges) having a width equal to 0.25 GPM, and centered at 0.25 GPM, 0.5 GPM, 0.75 GPM, 1.0 GPM, . . . , 5.0 GPM, 5.25 GPM, 5.5 GPM, 5.75 GPM and 6.0 GPM. Here, and for illustrative purposes, the bins (or corresponding time threshold values) of the fluid flow duration pattern are updated directly without using time counters. This is possible because there is no overlap between the bins (or value ranges) mapped to measurements of the first fluid flow event 302 and the bins (or value ranges) mapped to measurements of the second fluid flow event 304.

Figure 3D:
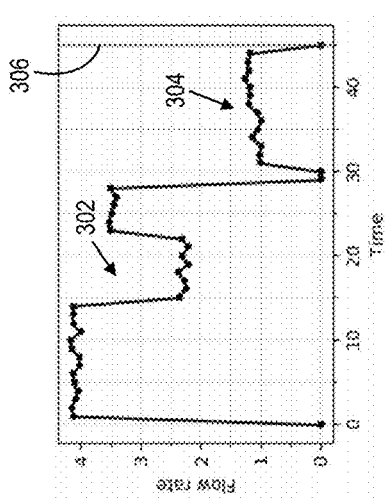
Figure 3E:
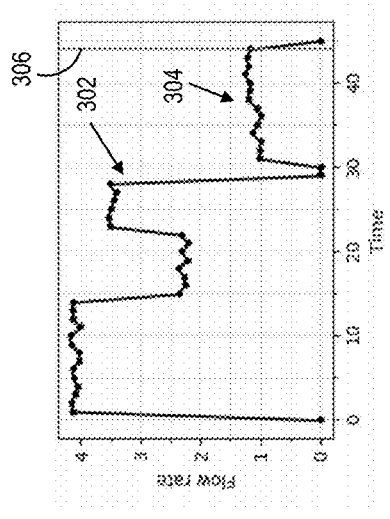
Figure 3F:
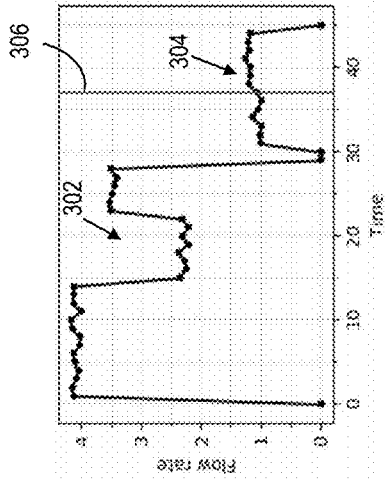
Figure 3J:
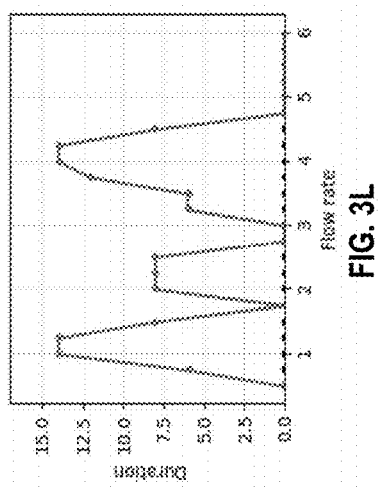
Figure 3K:
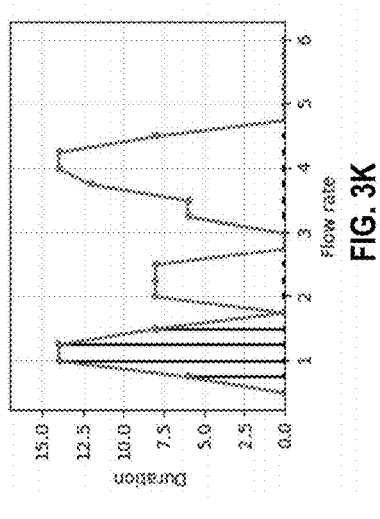
Figure 3L:
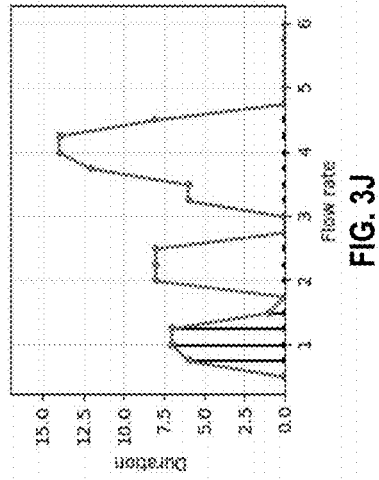

For each current measurement of the fluid flow rate, the processor 120 increments the bin (or value range) that includes the value of the current measurement as well as the two adjacent bins with the time increment equal to the time different between the current measurement and the preceding measurement. The time instance 306 in FIG. 3C indicates the end of the first fluid flow event 302, and FIG. 3I shows the training fluid flow duration pattern at the time instance 306 (or at the end of the first fluid flow event 302). The processing of the measurements associated with the second fluid flow event 304 is illustrated through FIGS. 3D-3F and 3J-3L. The time instance 306 in FIG. 3J indicates the end of the second fluid flow event 304, and FIG. 3L shows the final fluid flow duration pattern after processing all the fluid flow rate measurements. The time in (x-axis of) FIGS. 3A-3F and the duration in (y-axis) FIGS. 3G-3L represent time values in seconds, while the flow rate in all FIGS. 3A-3L represents the fluid flow rate in GPM.

Another example approach for generating the training fluid flow duration pattern is referred to herein as the "at least flow rate approach". The processor 120 can assign or maintain a separate time counter for each bin (or value range) of the training fluid flow duration pattern. For each fluid flow event, the processor 120 can process (e.g., sequentially) the respective sequence of fluid flow parameter measurements by (i) identifying a bin or value range of the training fluid flow duration pattern to which a current measurement of the sequence of measurements belongs, and (ii) incrementing time counters of bins (or value ranges) lower than the identified bin or value range by a time increment equal to a time difference between the current measurement and a preceding measurement. The processor 118 can assign each measurement of the fluid flow parameter associated with a fluid flow event to a corresponding bin and then increment the time counters of bins (or value ranges) lower than (or to the left of) that bin. A value range (or bin) is lower than another value range (or bin) when the values in the former are smaller than all values in the latter. In some implementations, the processor 120 may also increment the time counter for the identified bin. At the end of the fluid flow event, the processor 120 can, for each value range of the plurality of value ranges, (a) compare the respective time counter for the value range to the time threshold value for the value range, and (b) responsive to determining that the time threshold value for the value range is less than the respective time counter for the value range, update the respective time threshold value for the value range to be equal to the respective time counter for the value range. The processor 120 can reset the time counters at the end (or start) of each fluid flow event. At the end of the training phase, each time counter can represent the time threshold value of the corresponding bin.

An example implementation in pseudo-C of the flow duration using the at least flow rate approach is provided below.

```
import os
import sys
import pandas as pd
import numpy as np
# defines FR_START = 0.5
FR_END = 6.0
FR_INTERVAL = 0.25
n_thresholds = int((FR_END-FR_START)/FR_INTERVAL)+1 # unsigned short
minflowrates = np.empty(n_thresholds, dtype='float32') # float
thresholds = np.zeros(n_thresholds, dtype='fl0at32') # float
durations = np.zeros(n_thresholds, dtype='uint32') # uint32
margins = np.empty(n_thresholds, dtype='fl0at32') # float
offsets = np.array([439455, 439455, 439455, 439455, 439455, 439455, 439455, 439455, 439455,
439455, 439455, 421145, 382692, 349733, 320436, 292970, 267335, 245362, 232545, 225221, 221558,
223390], dtype='uint32')
# uint32
prev_timestamp = None # uint32
leak_alert = np.zeros(n_thresholds, dtype='bool') # bool
training_complete = False
offsets_applied = False
margins_applied = False
for i in range(n_thresholds):
        min_flowrates[i] = FR_START + i*FR_INTERVAL
        margins[i] = 1
def time_since_last_reading(timestamp):
        if prev_timestamp is None:
                return 0
        elif prev_timestamp > timestamp:
                return timestamp + 2**32 - prev_timestamp
        else:
                return timestamp - prev_timestamp
def train_update(timestamp, flowrate):
        dt = time_since_last_reading(timestamp) # uint32
        # For each minimum flow rate
        for i in range(n_thresholds):
                # if current flow rate is high enough to count towards duration
                if flowrate >= min_flowrates[i]:
                        durations[i] += dt
                # if the current flow has ended and the flow's duration was higher than the current threshold
                elif durations[i] > thresholds[i]:
                        thresholds[i] = durations[i] durations[i] = 0
                # if flow has ended, but the flow's duration was not higher than the current threshold
                else:
                        durations[i] = 0
        global prev_timestamp
        prev_timestamp = timestamp
def detect_update(timestamp, flowrate):
        dt = time_since_last_reading(timestamp) # uint32
        # For each minimum flow rate
        for i in range(n_thresholds):
                # if current flow rate is high enough to count towards duration
                if flowrate >= min_flowrates[i]:
                        durations[i] += dt
                else:
                        durations[i] = 0
                leak_alert[i] = durations[i] > thresholds[i]
        global prev_timestamp
        prey timestamp = timestamp
def check_leak_status( ):
        for i in range(n_thresholds):
                if leak_alert[i]:
                        return True
        return False
def set_training(complete=True):
        global training_complete
        training_complete = complete
def apply_offset( ):
        global offsets_applied
        if not training_complete:
                sys.stderr.write('Error in apply_offset( ): Cannot apply offset because training has not finished.\n')
```

```
            elif offsets_applied:
                    sys.stderr.write('Error in apply_offset( ): Threshold offset has already been
applied.\n')
            else:
                for i in range(n_thresholds):
                        thresholds[i] += offsets[i]
                offsets_applied = True
def main( ):
            os.chdir(r'C:\Users\ian.kent\Desktop\duration_eld\ctest')
            train = pd.read_pickle('a6545_train.py36pd21.pkl.xz', compression='xz')
            for i in range(len(train)):
                    flowrate = train.flowrate.iat[i]
                    timestamp = train.dsp_time.iat[i]
                    train_update(timestamp, flowrate)
            set_training(complete=True)
            apply_offset( )
            ctrained = pd.DataFrame(dict(min_flowrate=min_flowrates, thresh_dsp time=thresholds))
            ctrained['thresh_sec'] = ctrained.thresh_dsp_time.astype('float64') * 5.4613e-4
ctrained.to_csv('ctrained.csv', index=False)
            test = pd.read_pickle('a6545_test.py36pd21.pkl.xz', compression='xz')
            isleak_list = [0]*len(test)
            cdurations = {'posix': [], 'dsp_time_conv': [], 'min_flowrate': [], 'duration': []}
            for i in range(len(test)):
                    flowrate = test.flowrate.iat[i]
                    timestamp = test.dsp_time.iat[i]
                    detect_update(timestamp, flowrate)
                    isleak_list[i] = check_leak_status( )
                    cdurations['posix'].extend(test.posix.iat[i]]*n_thresholds)
                    cdurations['dsp_time_conv'].extend([test.dsp_time.iat[i]]*n_thresholds)
                    cdurations['min_flowrate'].extend(min_flowrates) cdurations['duration'].extend(durations)
            test['pseudo_c_leak'] = isleak_list
            test.to_pickle(1 a6545_test_w_pseudo_c_leak.py36pd21.pkl', compression=None)
            pd.DataFrame(cdurations).to_pickle('cdurations.py36pd21.pkl', compression=None)
if name_ == '_main_':
            main( )
```

FIGS. 4A-4L show example simulation results for generating the training fluid flow duration pattern using the at least flow rate approach described above. FIGS. 4A-4F show fluid flow rate measurements, similar to those of FIGS. 3A-3F, for two fluid flow events 402 and 404 that are respectively similar to events 402 and 404. The line 406 in FIGS. 4A-4F represents time instances indicating the progress in processing the fluid flow rate measurements. FIGS. 4G-4L represent the progress in generating the fluid flow duration pattern at the time instances 406 in FIGS. 4A-4F, respectively. Similar to FIGS. 3G-3L, the bins (or corresponding time threshold values) of the fluid flow duration pattern in FIGS. 4G-4L are updated directly without using time counters.

Figure 4A:
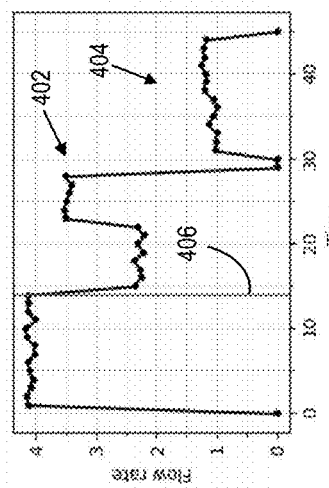
FIGS. 4A-4L show example simulation results of generating a training fluid flow duration pattern using a second approach, according to inventive concepts of the current disclosure.
Figure 4B:
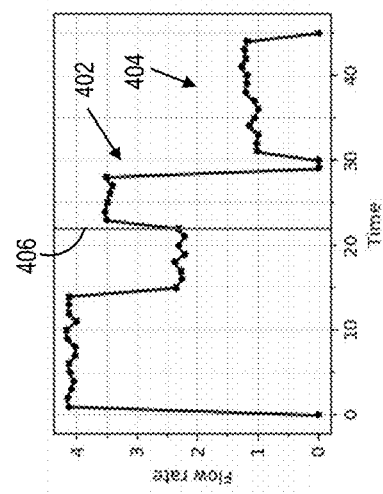
Figure 4C:
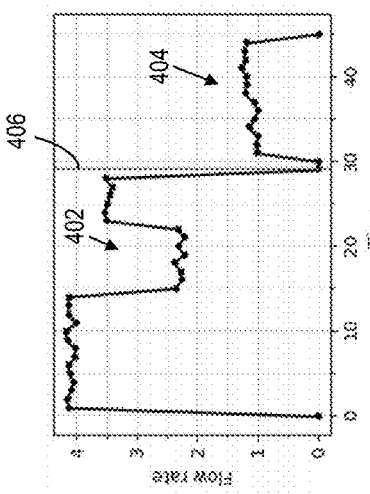
Figure 4G:
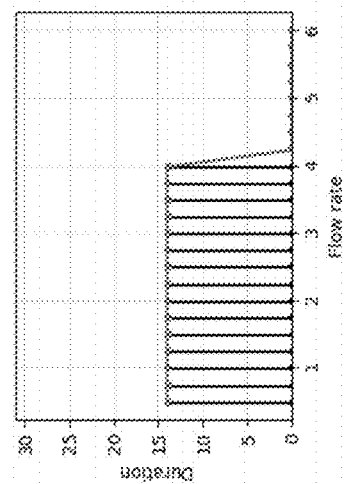
Figure 4H:
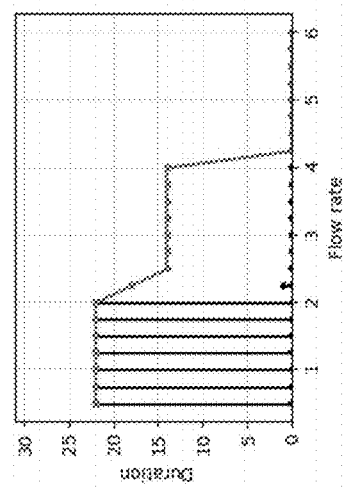
Figure 4I:
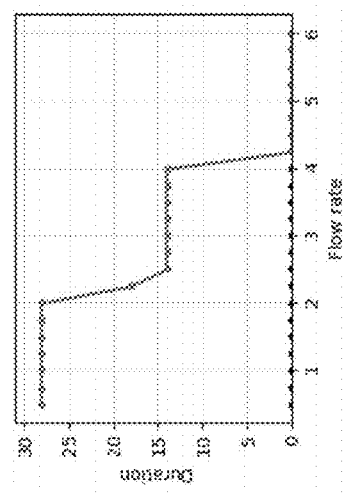
Figure 4D:
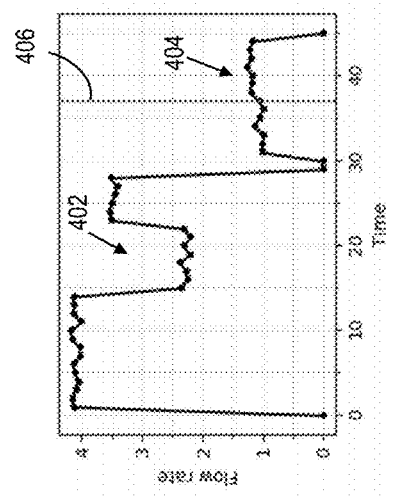
Figure 4E:
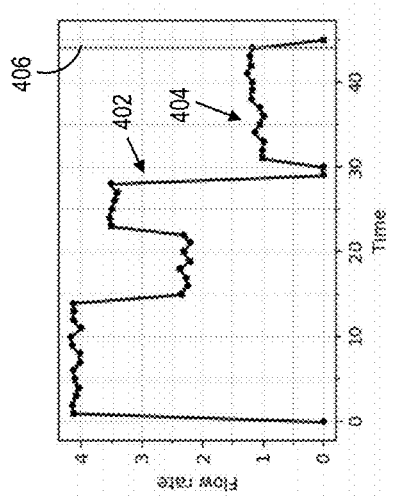
Figure 4F:
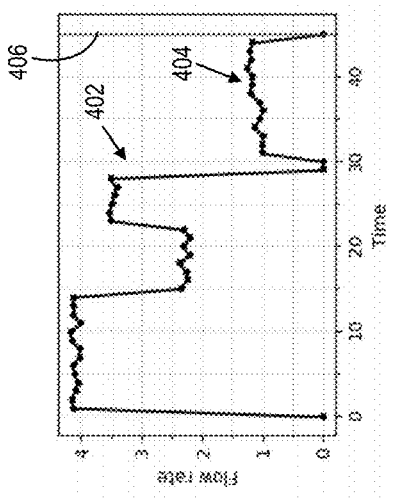
Figure 4J:
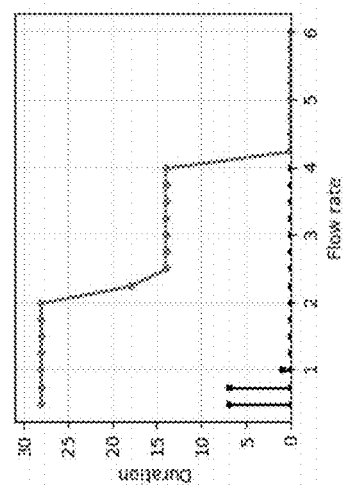
Figure 4K:
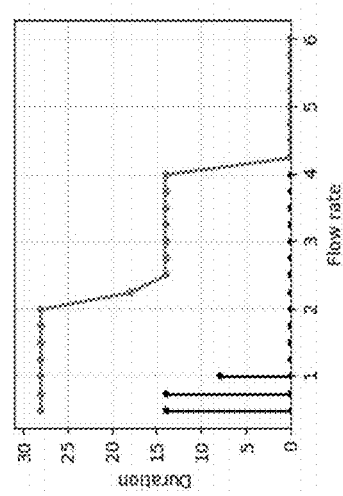
Figure 4L:
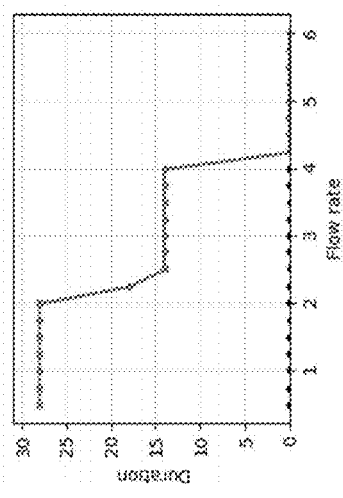

For each current measurement of the fluid flow rate, the processor 120 can increment the bins (or value ranges) lower than, or to the left of, the bin that includes the value of the current measurement with the time increment equal to the time different between the current measurement and the preceding measurement. The time instance 406 in FIG. 4C indicates the end of the first fluid flow event 402, and FIG. 4I shows the training fluid flow duration pattern at the time instance 406 of FIG. 4C (or at the end of the first fluid flow event 102). The processing of the measurements associated with the second fluid flow event 404 is illustrated through FIGS. 4D-4F and 4J-4L. The time instance 406 in FIG. 4J indicates the end of the second fluid flow event 404, and FIG. 4L shows the final fluid flow duration pattern after processing all the fluid flow rate measurements.

Another example approach for generating the training fluid flow duration pattern is referred to herein as the maximum flow rate approach. The processor 120 can assign or maintain a separate time counter for each value range or bin of the training fluid flow duration pattern. For each first fluid flow event, the processor 120 can process the respective sequence of fluid flow parameter measurements by (i) determining, for a current measurement, a maximum measurement of already processed measurements of the fluid flow event, (ii) identifying a value range or bin of the training fluid flow duration pattern to which the maximum measurement belongs, and (iii) incrementing a time counter of the identified value range (or bin) by a time increment equal to a time difference between the current measurement and a preceding measurement. For each measurement associated with the fluid flow event, the processor 120 can increment the time counter associated with the bin corresponding to the max flow parameter value recorded so far in that fluid flow event. In some implementations, the processor can increment the time counter of the identified value range (corresponding to the maximum measurement value recorded so far) and one or more other time counters of neighboring or adjacent value ranges (e.g., adjacent to the identified value range or bin). At the end of the fluid flow event (or after processing first measurements of the fluid flow event), the processor 120 can use time values associated with the time counters to update one or more corresponding time threshold values of the training fluid flow duration pattern. For example, the processor 120 can for each value range of the fluid flow duration pattern, (a) compare the time counter for the value range to the time threshold value for the same value range, and (b) responsive to determining that the time threshold value for the value range is less than the time counter for the value range, update the time threshold value for the value range to be equal to the time counter for the value range. The processor 120 can then reset the time counters to zero.

FIGS. 5A-5L show example simulation results of generating the training fluid flow duration pattern using the maximum flow rate approach described above. FIGS. 5A-5F show fluid flow rate measurements, similar to those of FIGS. 3A-3F and 4A-4F, for two fluid flow events 502 and 504 that are respectively similar to events 302 and 304. The line 506 in FIGS. 5A-5F represents time instances indicating the progress in processing the fluid flow rate measurements. FIGS. 5G-5L represent the progress in generating the fluid flow duration pattern at the time instances 506 in FIGS. 5A-5F, respectively. Similar to FIGS. 3G-3L, the bins (or corresponding time threshold values) of the fluid flow duration pattern in FIGS. 5G-5L are updated directly without using time counters.

Figure 5A:
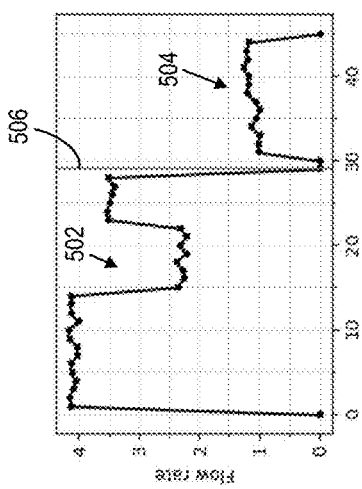
FIGS. 5A-5L show example simulation results of generating a training fluid flow duration pattern using a third approach, according to inventive concepts of the current disclosure.
Figure 5B:
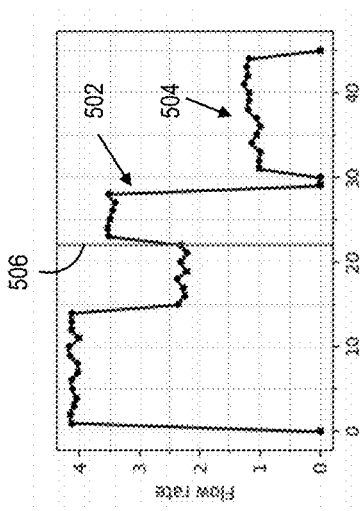
Figure 5C:
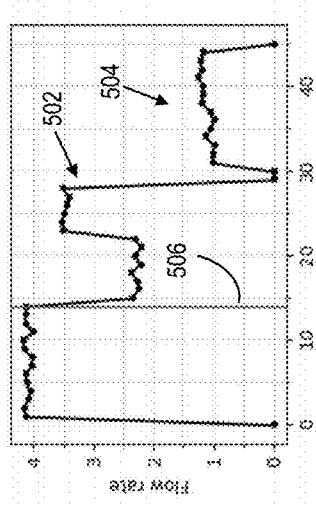
Figure 5G:
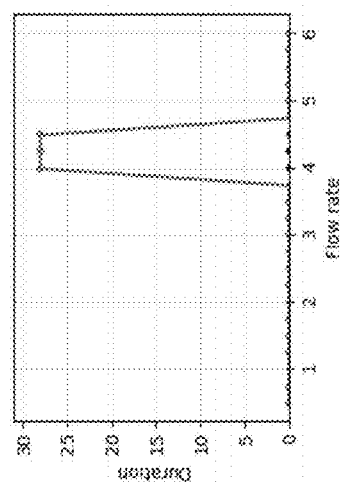
Figure 5H:
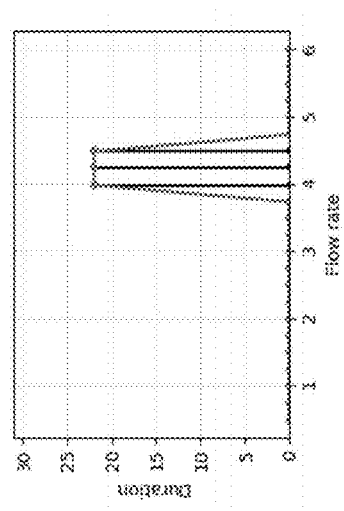
Figure 5I:
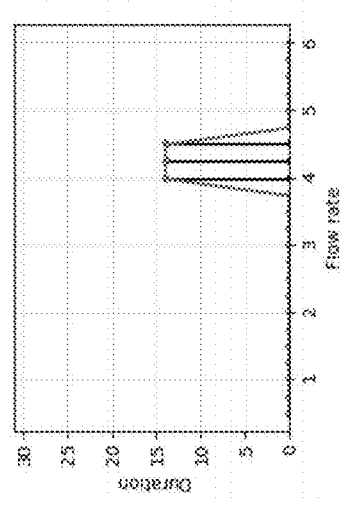
Figure 5D:
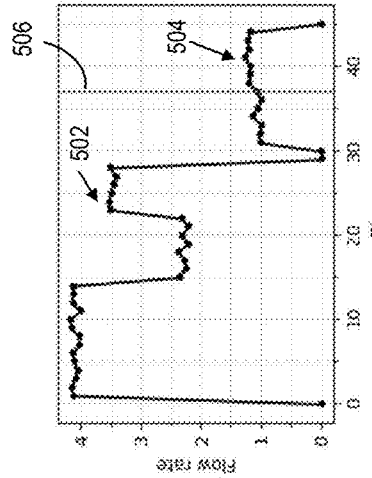
Figure 5E:
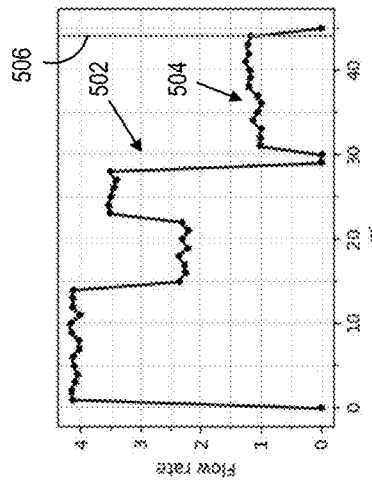
Figure 5F:
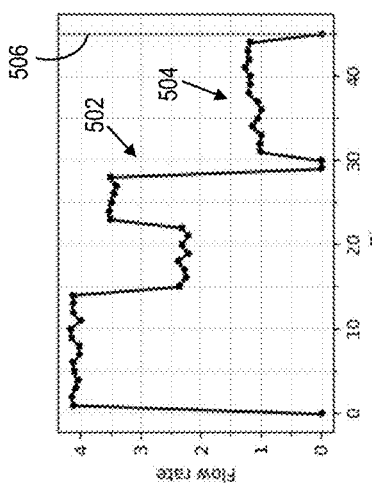
Figure 5J:
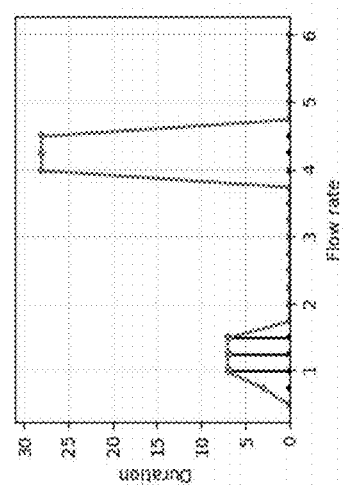
Figure 5K:
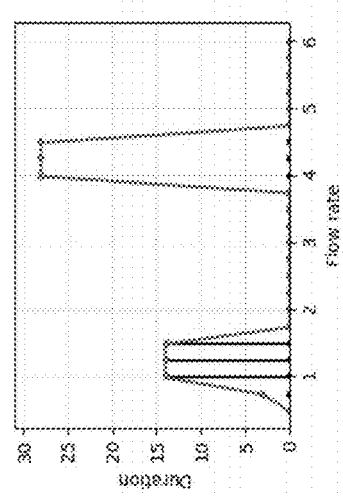
Figure 5L:
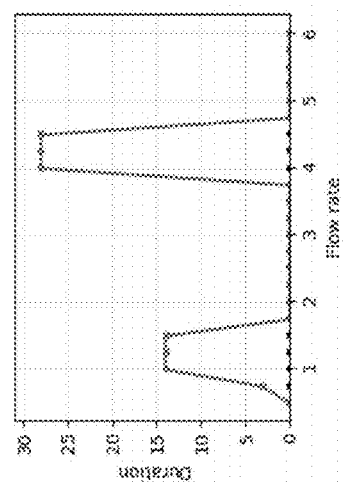

For each current measurement of the fluid flow rate, the processor 120 can determine the maximum measurement value recorded or processed so far in the current fluid flow event, and increment the bin that includes the maximum measurement value recorded or processed so far with the time increment equal to the time different between the current measurement and the preceding measurement. The processor 120 can also increment the neighboring bins or value ranges. The time instance 506 in FIG. 5C indicates the end of the first fluid flow event 502, and FIG. 5I shows the training fluid flow duration pattern at the time instance 506 of FIG. 5C (or at the end of the first fluid flow event 502). The processing of the measurements associated with the second fluid flow event 504 is illustrated through FIGS. 5D-5F and 5J-5L. The time instance 506 in FIG. 5J indicates the end of the second fluid flow event 504, and FIG. 5L shows the final fluid flow duration pattern after processing all the fluid flow rate measurements.

Figure 6:
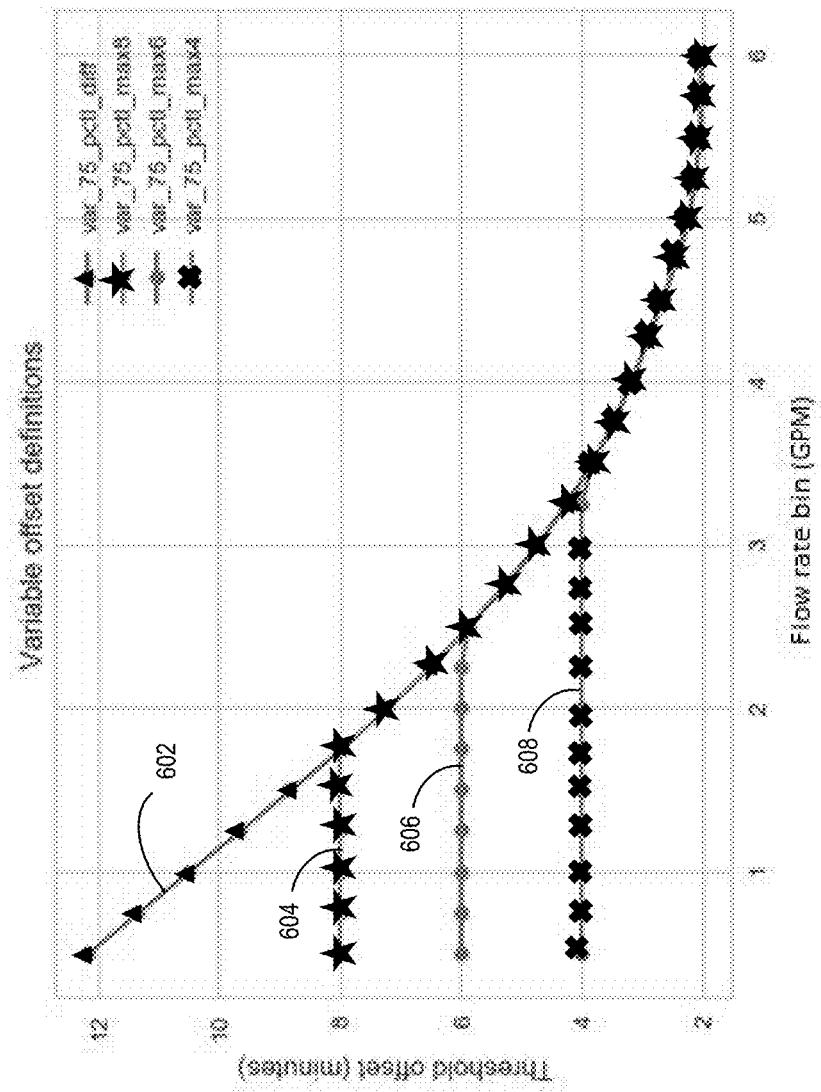
FIG. 6 shows example functions or patterns of offset values for post-processing a training flow duration pattern.

At the end of the training phase, the processor 120 or the fluid flow meter may apply post processing to the training fluid flow duration pattern, such as by incrementing the time threshold value for each bin (of the training flow duration pattern) by a respective offset value. The added offset values can help reduce false alarms in the detection process. The processor 120 can add the same offset value to all time threshold values of all bins, or can add different offset values for distinct bins. FIG. 6 shows various example patterns or functions 602, 604, 606 and 608 of offset values. According to the patterns or functions 602, 604, 606 and 608, smaller offset values can be added to relatively highe value ranges (e.g., including larger values of the fluid flow parameter) compared to lower bins (e.g., including smaller values of the fluid flow parameter). In some implementations, the processor 120 or the server 108 can test and assess the detection performance for various offset values patterns or functions, and select one or more of the tested patterns for use in post processing the training flow duration pattern. The selection can be based on the number of false alarms (or false alerts) and/or the number of missed targets for each offsets values pattern or function.

Referring back to FIGS. 1 and 2, and once the training phase is complete and the training fluid flow duration pattern is completely generated, the processor 120 or the fluid flow meter 102 can use the training (or trained) flow duration pattern during the detection phase to monitor fluid usage. The method 200 can include the processor 120 or the fluid flow meter 102 determining, using a plurality of second measurement signals obtained during a detection phase subsequent to the training phase, a plurality of second measurements of the fluid flow parameter and second timing information (ACT 208). The processor 120 can obtain the plurality of second measurement signals from the fluid flow sensor 116. Upon receiving the second measurement signals associated with a current fluid flow event from the fluid flow sensor 116, the processor 120 can generate the corresponding second measurements of the fluid flow parameter and the second timing information as discussed above with regarding to the training phase. As discussed above with regard to ACT 202, the processor 120 or the fluid flow meter 102 can compute (or determine) a second fluid flow parameter measurement, for example, for each second measurement signal. The plurality of second fluid flow parameter measurements can be associated with a second fluid flow event occurring during the detection phase. The processor 120 can also determine the second timing information, for example, as discussed above with respect to the first timing information. The second timing information, similar to the first timing information, can be indicative of time intervals (or time differences) between consecutive second measurements. The second fluid flow event can be an ongoing fluid flow event representing a sequence of measurements larger than the predefined value and preceded by a measurement that is smaller than (or equal to) the predefined value.

The method 200 can include the processor 120 or the fluid flow meter 102 determining, using the plurality of second measurements and the second timing information, a flow duration period (within the second fluid flow event) associated with a value range or bin of the plurality of value ranges or bins (ACT 210). The processor 120 or the fluid flow meter 102 can determine the flow duration period in a similar way the training fluid flow duration pattern is generated. In other words, during the second fluid flow event, the processor 120 can maintain a separate detection time counter for each bin or value range, and update the detection time counters in similar way as the time counters maintained during the training phase are updated. For instance, if the time duration with buffer approach is used during the training phase, the processor 120 can identify for a current second measurement of the fluid flow event the bin or value range to which the value of the current second measurement belongs and then increment the detection time counter for the identified bin as well as the detection time counters for adjacent bins. If the training fluid flow duration pattern is generated using the "at least flow rate approach," the processor 120 can identify for a current second measurement of the fluid flow event the bin or value range to which the value of the current second measurement belongs and then increment the detection time counters for all bins lower than the identified bin. However, if the training fluid flow duration pattern is generated using the "maximum flow rate approach," the processor 120 can identify for a current second measurement of the fluid flow event the bin or value range to which the maximum measurement value recorded so far (in the fluid flow event) belongs and then increment the detection time counter for identified bin (and in some implementations detection time counters for the adjacent bins).

The method 200 can include the processor 120 or the fluid flow meter 102 detecting a leak event based on a comparison of a time duration for a value range with the time threshold value for the same value range (ACT 212). The processor 120 can compare each detection time counter associated with a corresponding bin or value range to the time threshold value for the same bin or value range in the training fluid low duration pattern. At any point in time, if detection time counter associated with a given bin or value range exceeds the time threshold value for the same bin or value range in the training fluid low duration pattern, the processor can detect a fluid leak event (or abnormal fluid usage/flow event).

Upon detecting a leak event or an abnormal fluid usage/flow event, the processor 120 or the fluid flow meter 102 can report such detection to the computer server 108. The computer server 108 may decide whether or not to report the detection of the leak event or abnormal fluid usage/flow event to the client device 110 or the client application 114 running thereon. The client application 114 can be provided by a manufacturer or provider of the fluid flow meter 102. The client application 114 can provide an interactive UI allowing a user of the client device 110, for example, to send feedback or instructions to the computer server 108 or the fluid flow meter 102. For example, the user can verify whether there is a leak (or abnormal usage/flow event) or not, and send feedback to confirm or deny the detected event. Given the feedback from the client device 110, the computer server 108 modify one or more parameters of the detection method employed. The processor 120 can, responsive to the user feedback, use the measurements associated with fluid flow event that led to the detection as additional training data, for example, to adjust the training flow duration pattern.

Upon detecting a leak event or an abnormal fluid usage/flow event, or responsive to instructions from the client device, the processor 120 or the fluid flow meter 102 can actuate the shut-off valve 128 to block fluid flow through the lumen 106. It is to be noted, that the fluid leak events can refer to fluid leaks in the fluid distribution system downstream of the fluid flow meter 102 (or the shut-off valve 128). Also, abnormal fluid usage/flow events can be caused by a device or malfunction in the fluid distribution system downstream of the fluid flow meter 102 (or the shut-off valve 128).

The methods described herein can be implemented as computer executable instructions that are stored on non-transitory computer readable medium (e.g., memory). The computer executable instructions can be executed by one or more processors to perform the corresponding methods. The methods described herein can be performed by the fluid flow meter 102, the computer server 108, the client device 110 or a combination thereof.

What is claimed is:

1. A fluid flow meter comprising:
    a fluid flow sensor to generate fluid flow measurement signals indicative of fluid flow through a lumen of a fluid distribution system;
    a memory to store data and computer code instructions; and
    a processor communicatively coupled to the fluid flow sensor and the memory, the processor to execute the computer code instructions to:
        determine, using a plurality of first measurement signals generated by the fluid flow sensor during a training phase subsequent to installation of the fluid flow meter in the fluid distribution system, a corresponding plurality of first measurements of a fluid flow parameter and first timing information, the fluid flow parameter including fluid flow rate or fluid flow velocity, and the first timing information indicative of time intervals between consecutive first measurements;
        identify, using the plurality of first measurements, a plurality of first fluid flow events, each first fluid flow event representing a sequence of non-zero measurements of the plurality of first measurements;
        generate, using the plurality of first measurements, the first timing information and the plurality of first fluid flow events, a training flow duration pattern including a plurality of bins, each bin representing (i) a value range of a plurality of value ranges of the fluid flow parameter and (ii) a corresponding time duration threshold representing an estimate of maximum cumulative time during which the fluid flow parameter, for any of the plurality of fluid flow events, is within the respective value range;
        determine, using a plurality of second measurement signals obtained from the fluid flow sensor during a detection phase subsequent to the training phase, a plurality of second measurements of the fluid flow parameter and second timing information, the second timing information indicative of time intervals between consecutive second measurements and the plurality of second measurements associated with a second fluid flow event representing a sequence of non-zero measurements;
        determine, using the plurality of second measurements and the second timing information, for a first bin of the plurality of bins associated with a respective first value range of the plurality of value ranges, a second time duration representing cumulative time of the second fluid flow event during which the fluid flow parameter is within the first value range; and
        detect a leak event based on a comparison of the second time duration to the time duration threshold of the first bin.

2. The fluid flow meter of claim 1, wherein the fluid flow sensor includes an ultrasonic fluid flow sensor.

3. The fluid flow meter of claim 1, wherein in generating the training flow duration pattern the processor is configured to:
    assign, for each bin of the plurality of bins, a respective time counter;
    for each first fluid flow event of the plurality of first fluid flow events,
        process the respective sequence of non-zero measurements by (i) identifying a bin of the plurality of bins with a respective value range to which a current measurement of the respective sequence of non-zero measurements belongs, and (ii) incrementing a time counter of the identified bin by a time increment equal to a time interval between the current measurement and a preceding measurement;
        for each bin of the plurality of bins, (a) compare the respective time counter for the bin to the time duration threshold for the bin, and (b) responsive to determining that the time duration threshold for the bin is less than the respective time counter for the bin, update the respective time duration threshold for the bin to be equal to the respective time counter for the bin; and
    reset, for each bin of the plurality of bins values ranges, the respective time counter to zero after processing the respective sequence of non-zero measurements.

4. The fluid flow meter of claim 3, wherein in incrementing the respective time counter for the identified bin, the processor is configured to further increment one or more other time counters associated with one or more other bins in the neighborhood of the identified bin by the time increment equal to the time interval between the current measurement and the previous measurement.

5. The fluid flow meter of claim 1, wherein in generating the training flow duration pattern the processor is configured to:
    assign, for each bin of the plurality of bins, a respective time counter;
    for each first fluid flow event of the plurality of first fluid flow events, process the respective sequence of non-zero measurements by (i) determining, for a current measurement, a maximum measurement of already processed measurements among the respective sequence of non-zero measurements, (ii) identifying a bin of the plurality of bins with a respective value range to which the maximum measurement belongs, and (iii) incrementing a respective time counter of the identified bin by a time increment equal to a time interval between the current measurement and a preceding measurement;

for each bin of the plurality of bins, (a) compare the respective time counter for the bin to the time duration threshold for the bin, and (b) responsive to determining that the time duration threshold for the bin is less than the respective time counter for the bin, update the respective time duration threshold for the bin to be equal to the respective time counter for the bin; and reset, for each bin of the plurality of bins values ranges, the respective time counter to zero after processing the respective sequence of non-zero measurements.

6. The fluid flow meter of claim 5, wherein in incrementing the respective time counter for the identified bin, the processor is configured to further increment one or more other time counters associated with one or more other bins in the neighborhood of the identified bin by the time increment equal to the time interval between the current measurement and the previous measurement.

7. The fluid flow meter of claim 1, wherein in generating the training flow duration pattern the processor is configured to:

assign, for each bin of the plurality of bins, a respective time counter;

for each first fluid flow event of the plurality of first fluid flow events,
process the respective sequence of non-zero measurements by (i) identifying a bin of the plurality of bins with a respective value range of the plurality of value ranges to which a current measurement of the respective sequence of non-zero measurements belongs, and (ii) incrementing time counters of bins equal to or lower than the identified bin by a time increment equal to a time interval between the current measurement and a preceding measurement;

for each bin of the plurality of bins, (a) compare the respective time counter for the bin to the time duration threshold for the bin, and (b) responsive to determining that the time duration threshold for the bin is less than the respective time counter for the bin, update the respective time duration threshold for the bin to be equal to the respective time counter for the bin; and reset, for each bin of the plurality of bins, the respective time counter to zero after processing the respective sequence of non-zero measurements.

8. The fluid flow meter of claim 1, wherein the processor is further configured to post-process the training flow duration pattern by incrementing each time duration threshold associated with a corresponding bin of the plurality of bins with a respective constant time value.

9. The fluid flow meter of claim 1, further comprising a communication interface for communicating with a remote computing device, the processor further configured to transmit an alert to the remote computing device responsive to detecting the leak event.

10. The fluid flow meter of claim 1, further comprising a shut-off valve for blocking fluid through the lumen, the processor further configured to actuate the shut-off valve responsive to detecting the leak event.

11. The fluid flow meter of claim 10, wherein the remote computing device includes a client application installed thereon for presenting alerts received from the fluid flow meter.

12. A method of detecting fluid leak events, the method comprising:

determining, by a fluid flow meter and using a plurality of first measurement signals generated during a training phase subsequent to installation of the fluid flow meter in a fluid distribution system, a corresponding plurality of first measurements of a fluid flow parameter and first timing information, the fluid flow parameter including fluid flow rate or fluid flow velocity, and the first timing information indicative of time intervals between consecutive first measurements;

identifying, by the fluid flow meter and using the plurality of first measurements, a plurality of first fluid flow events, each first fluid flow event representing a sequence of non-zero measurements of the plurality of first measurements;

generating, by the fluid flow meter and using the plurality of first measurements, the first timing information and the plurality of first fluid flow events, a training flow duration pattern including a plurality of bins, each bin representing (i) a value range of a plurality of value ranges of the fluid flow parameter and (ii) a corresponding time duration threshold representing an estimate of maximum time during which the fluid flow parameter, for any of the plurality of fluid flow events, is within the respective value range;

determining, by the fluid flow meter and using a plurality of second measurement signals obtained during a detection phase subsequent to the training phase, a plurality of second measurements of the fluid flow parameter and second timing information, the second timing information indicative of time intervals between consecutive second measurements and the plurality of second measurements associated with a second fluid flow event representing a sequence of non-zero measurements;

determining, by the fluid flow meter and using the plurality of second measurements and the second timing information, for a first bin of the plurality of bins associated with a respective first value range of the plurality of value ranges, a second time duration representing cumulative time of the second fluid flow event during which the fluid flow parameter is within the first value range; and detecting, by the fluid flow meter, a leak event based on a comparison of the second time duration to the time duration threshold of the first bin.

13. The method of claim 12, wherein generating the training flow duration pattern includes:

assigning, for each bin of the plurality of bins, a respective time counter;

for each first fluid flow event of the plurality of first fluid flow events,
processing the respective sequence of non-zero measurements by (i) identifying a bin of the plurality of bins with a respective value range to which a current measurement of the respective sequence of non-zero measurements belongs, and (ii) incrementing a time counter of the identified bin by a time increment equal to a time interval between the current measurement and a preceding measurement;

for each bin of the plurality of bins, (a) comparing the respective time counter for the bin to the time duration threshold for the bin, and (b) responsive to determining that the time duration threshold for the bin is less than the respective time counter for the bin, updating the respective time duration threshold for the bin to be equal to the respective time counter for the bin; and resetting, for each bin of the plurality of bins, the respective time counter to zero after processing the respective sequence of non-zero measurements.

14. The method of claim 13, wherein incrementing the time counter for the identified bin further includes incrementing one or more other time counters associated with one or more other bins in the neighborhood of the identified bin by the time increment equal to the time interval between the current measurement and the previous measurement.

15. The method of claim 12, wherein generating the training flow duration includes:

assigning, for each value range of the plurality of bins, a respective time counter;

for each first fluid flow event of the plurality of first fluid flow events, processing the respective sequence of non-zero measurements by (i) determining, for a current measurement, a maximum measurement of already processed measurements among the respective sequence of non-zero measurements, (ii) identifying a bin of the plurality of bins with a respective value range to which the maximum measurement belongs, and (iii) incrementing a respective time counter of the identified bin by a time increment equal to a time interval between the current measurement and a preceding measurement;

for each bin of the plurality of bins, (a) comparing the respective time counter for the bin to the time duration threshold for the bin, and (b) responsive to determining that the time duration threshold for the bin is less than the respective time counter for the bin, updating the respective time duration threshold for the bin to be equal to the respective time counter for the bin; and resetting, for each bin of the plurality of bins, the respective time counter to zero after processing the respective sequence of non-zero measurements.

16. The method of claim 15, wherein incrementing the time counter for the identified bin further includes incrementing one or more other time counters associated with one or more other bins in the neighborhood of the identified bin by the time increment equal to the time interval between the current measurement and the previous measurement.

17. The method of claim 12, wherein generating the training flow duration pattern includes:

assigning, for each bin of the plurality of bins, a respective time counter;

for each first fluid flow event of the plurality of first fluid flow events, processing the respective sequence of non-zero measurements by (i) identifying a bin of the plurality of bins with a respective value range to which a current measurement of the respective sequence of non-zero measurements belongs, and (ii) incrementing time counters of bins equal to or lower than the identified bin by a time increment equal to a time interval between the current measurement and a preceding measurement;

for each bin of the plurality of bins, (a) comparing the respective time counter for the bin to the time duration threshold for the bin, and (b) responsive to determining that the time duration threshold for the bin is less than the respective time counter for the bin, updating the respective time duration threshold for the bin to be equal to the respective time counter for the bin; and resetting, for each bin of the plurality of bins, the respective time counter to zero after processing the respective sequence of non-zero measurements.

18. The method of claim 12, further comprising:

post-processing the training flow duration pattern by incrementing each time duration threshold associated with a corresponding bin of the plurality of bins with a respective constant time value.

19. The method of claim 12, further comprising:

transmitting an alert to a remote computing device responsive to detecting the leak event; or actuating a shut-off valve responsive to detecting the leak event.

20. A non-transitory computer-readable medium comprising computer code instructions stored thereon, the computer code instructions, when executed by one or more processors, cause the one or more processors to:

determine, using a plurality of first measurement signals generated during a training phase subsequent to installation of a fluid flow meter in a fluid distribution system, a corresponding plurality of first measurements of a fluid flow parameter and first timing information, the fluid flow parameter including fluid flow rate or fluid flow velocity, and the first timing information indicative of time intervals between consecutive first measurements;

identify, using the plurality of first measurements, a plurality of first fluid flow events, each first fluid flow event representing a sequence of non-zero measurements of the plurality of first measurements;

generate, using the plurality of first measurements, the first timing information and the plurality of first fluid flow events, a training flow duration pattern including a plurality of bins, each bin representing (i) a value range of a plurality of value ranges of the fluid flow parameter and (ii) a corresponding time duration threshold representing an estimate of maximum cumulative time during which the fluid flow parameter, for any of the plurality of fluid flow events, is within the respective value range;

determine, using a plurality of second measurement signals obtained during a detection phase subsequent to the training phase, a plurality of second measurements of the fluid flow parameter and second timing information, the second timing information indicative of time intervals between consecutive second measurements and the plurality of second measurements associated with a second fluid flow event representing a sequence of non-zero measurements of the plurality of second measurements;

determine, using the plurality of second measurements and the second timing information, for a first bin of the plurality of bins associated with a respective first value range of the plurality of value ranges, a second time duration representing cumulative time of the second fluid flow event during which the fluid flow parameter is within the first value range; and detect a leak event based on a comparison of the second time duration to the time duration threshold of the first bin.

* * * * *